United States Patent [19]
Edwards

[11] 3,851,476
[45] Dec. 3, 1974

[54] METHOD AND APPARATUS FOR BREAKING WAVES

[76] Inventor: Morgan Llewellyn Edwards, 5933 Corsica Dr., Dayton, Ohio 45424

[22] Filed: Nov. 29, 1972

[21] Appl. No.: 310,422

[52] U.S. Cl. .................................. 61/1 R, 61/4
[51] Int. Cl. .............................................. E02b 3/04
[58] Field of Search ............ 61/4, 1 R, 5, 6; 4/172, 4/172.16; 272/32, 1 B; 60/398; 91/61

[56] References Cited
UNITED STATES PATENTS

| | | |
|---|---|---|
| 2,584,867 | 2/1952 | Guarin .................................. 61/5 |
| 3,085,404 | 4/1963 | Smith .................................. 61/5 |
| 3,408,901 | 11/1968 | Inhofer ................................ 91/61 |
| 3,611,727 | 10/1971 | Blanford ............................. 61/1 R |

Primary Examiner—W. C. Reynolds
Assistant Examiner—Alex Grosz
Attorney, Agent, or Firm—Biebel, French & Bugg

[57] ABSTRACT

A platform is supported beneath the surface of a body of water and may be remotely raised or lowered to a height causing waves passing thereover to break. Means are also provided to rotate the platform for further controlling the manner in which the waves break.

5 Claims, 6 Drawing Figures

PATENTED DEC 3 1974
3,851,476
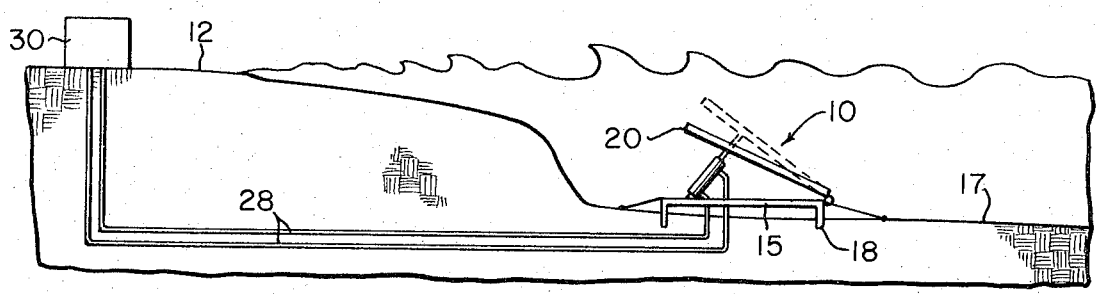
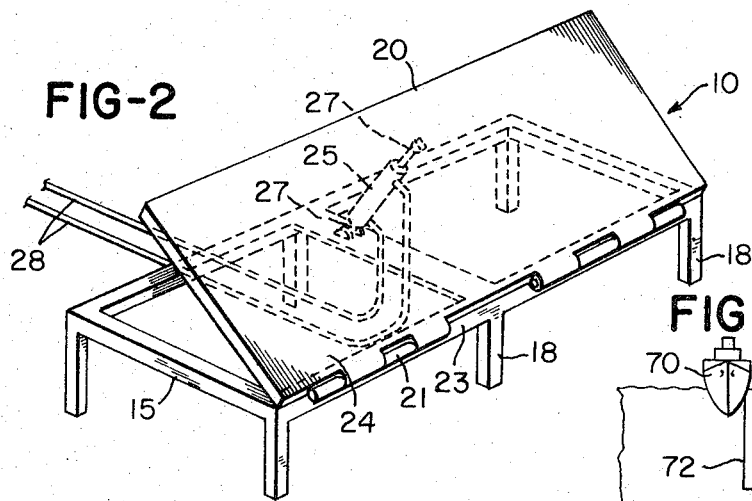
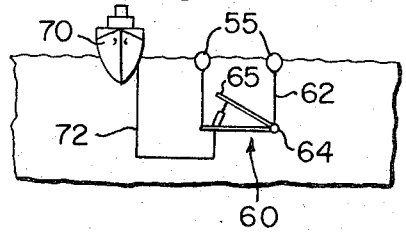
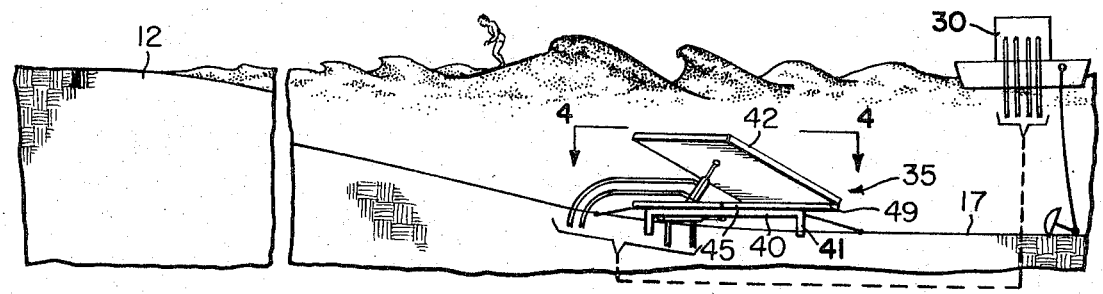
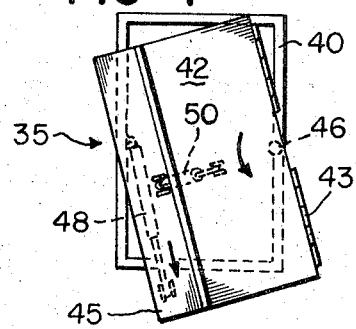
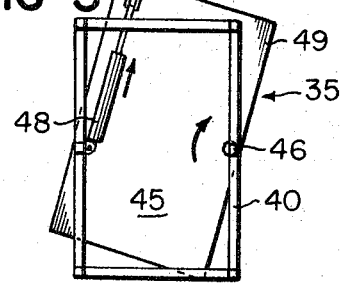

METHOD AND APPARATUS FOR BREAKING WAVES

BACKGROUND OF THE INVENTION

This invention relates to the control of waves, and more particularly to an apparatus and method for artificially inducing waves to break in a controllable fashion, at an earlier time, and at a generally fixed location farther from shore, than would otherwise occur.

The prior art includes many wave control methodsand devices, most of which are directed to reducing erosion and other wave damage, particularly along beach areas, piers, harbors, and so on. U.S. Pat. No. 2,967,398, for example, illustrates a massive device which actually physically blocks waves by projecting above the sea surface and forcing the waves to expend their force and energy against the structure itself.

Since such prior art structures are subjected to and must continuously withstand these great and never-ending stresses, they must accordingly be exceptionally strong. They are thus inevitably massive and expensive in relation to the waves they must control, even in limited applications.

On the other hand, waves are a definite and desired asset in many seaside areas. For example, a gentle surf is definitely preferred in resort areas, and good waves are of course indispensible for good surfboard riding. However, as surfboard enthusiasts will readily attest, not every beach provides ideal surfing conditions. The waves are either too small, too large, or simply do not break as desired. These same factors, of course, also have a substantial effect upon the attractiveness of a given resort area, not only from day to day, but also from year to year.

The use of prior art wave control devices, such as that of the '398 patent mentioned above, obviously does not provide a solution for all of these problems. The complete attenuation of these waves is certainly not the solution, since a wholly calm sea is almost as unattractive as a rough sea. Further, during periods of exceptionally rough seas, such structures would be subjected to forces they could not withstand, or else they would be so massive and expensive as to be altogether impractical for wide utilization.

The prior art thus fails to provide a single inexpensive solution to the above problems, that is, one which is able to attenuate the force and destructive power of even the most massive storm and tidal waves, while at the same time able to control but not eliminate the smaller waves, to provide more or less ideal seaside conditions.

As discussed at considerable length by Willard Bascom in his book *Waves and Beaches* (Anchor Books, Garden City, New York, 1964), the regular large waves which commonly roll ashore from the ocean are usually generated by wind storms hundreds and even thousands of miles distant. Just beyond the storm sight the waves organize themselves into swell which is able to travel for hundreds and even thousands of miles with very little loss of energy or amplitude (Bascom, page 62). By the time these waves reach the shore, they have achieved a uniform, steady state configuration which will continue virtually unchanged for hours at a time. Oftentimes the waves from several storms arrive together and add their strength as they generate interference patterns, again presenting cyclical wave patterns which continue for hours with little change.

As a wave comes ashore, it will start to break when the depth of the water is roughly equal to 1.3 times the wave height. The particular way in which the wave breaks is a function of the topography of the adjacent sea bed. An irregular bed, a rough bed, a steeply sloping bed, sand bars, reefs, and so on can cause what otherwise would be a gently spilling wave to be a plunging breaker, or even literally to explode, as the wave energy is released.

Due to the action of the waves, the sand bottom near the shore is forever being rearranged, causing the underwater topography to be in a constant state of flux. The tides are forever changing the relationship of the water surface to the sea bed near the shore, and the underwater topography of most shores is quite uneven to begin with. An irregular and ever changing seashore environment is thus forever presented to the incoming waves.

As will be appreciated, the prior art has failed to provide a solution for controlling all of these variables. A permanent structure can do little more than to attenuate the waves altogether. But where it is desired merely to control the waves to make a beach area attractive for swimming and bathing, to guarantee desirable surf conditions for surfboard contests, to attenuate the waves just a little to improve a resort area, and so on, the prior art fails to provide a solution.

SUMMARY OF THE INVENTION

Briefly, this invention provides an artificial shore machine, the base of which is anchored to the bed or floor near the shore of the body of water to be controlled. The anchor is any conventional anchorage means, such as legs or posts which penetrate into the sea floor to maintain the base in position. Alternatively, the shore machine may be supported at the desired depth by attachment to a ship, a barge, or other convenient float, and may thus also be used quite far from shore.

A relatively flat platform means is attached to the base by means of a hinge along the side of the base closest to the incoming waves, and generally most distant from the shore. The end of the platform away from the approaching waves is then free to move on the hinge upwardly and downwardly to vary the slope of the platform and the height of the edge of the platform away from the waves (nearest the shore).

A double acting hydraulic cylinder is connected between the base and the platform to move the platform up and down relative to the base, in controlled fashion. The hydraulic cylinder is remotely controlled by means of hydraulic oil lines connected to a conveniently located remote control station on the shore or on board a ship (or barge) near the machine. When it is desired to initiate the breaking of a wave sooner than would occur naturally, the platform is elevated according to the depth of the water thereadjacent and according to the height of the waves present at the time. The end of the platform away from the approaching wave is brought to a distance from the water surface of approximately 1.3 times the wave height, causing the wave to break as it passes over the end of the platform. The wave will continue to break for some time thereafter, and if it is desired either to dissipate even more of the wave energy, so as to diminish the amplitude or continue the wave breaking for a longer period of time, additional shore machines may be used in tandem, one after the other, as the wave moves therepast.

It is noteworthy in this regard that the energy of even tremendous waves can be greatly attenuated with but modestly sized shore machines constructed according to this invention. This is so since the waves are actually induced to destroy themselves and to use up their energy acting against themselves in chaotic turbulence, not against the shore machine. The forces on the platform are actually quite small in comparison to the forces and energies consumed in the corresponding waves.

A turntable and appropriate control and drive means may be mounted between the platform and the base to rotate the platform relative to the base to cause the wave to break "crosswise" thereover. That is, instead of breaking all at once along the entire wave front, since the platform is slightly rotated the wave will reach one end of the elevated platform before the other, will then travel across the elevated end to the other side, and the surface portion of the wave will break in similar fashion as it passes over first one side of the elevated end and then across to the other side. Such a pattern is of particular interest to surfboard riders and would be particularly useful in surfboard contests, where a variety of different wave conditions could be provided by adjusting not only the height of the end of the platform, but also the angle of the platform relative to the incoming wave.

It is therefore an object of this invention to provide an artificial shore machine for controlling waves and for initiating the breaking of the waves in a controllable fashion; an artificial shore machine having a base which may be supported at a predetermined depth beneath the surface of a body of water, or anchored to the floor of the body of water near the shore thereof; having a platform means hingedly attached to the base for movement relative thereto to vary the height and slope of the platform means relative to the base means; having an actuating means remotely controllable to adjust and maintain the height of the platform to control the breaking of the waves as they pass thereover; which may also include a turntable means rotatably mounted on the base means and rotatable thereabout on a generally vertical axis, and having the platform means hingedly attached to the turntable; which may then be adjusted relative to the incoming waves to cause the waves to break as desired as they pass over the platform means; which enables the waves to be controlled to provide desired shore conditions relatively independently of the particular topography of the bed of water thereadjacent, and relatively independently of changing conditions in that bed, changing tide conditions, and the size of the waves; which may be used in tandem to extend the period of time the waves break and to provide additional capacity for attenuating the size and energy of the waves; which may be constructed of only moderate size and strength relative to the size and energy of the waves to be controlled; which attenuates the wave energy by causing the wave to destroy itself by inducing the wave to use up its energy by breaking into chaotic turbulence; which is accordingly inexpensive in construction; which is uncomplicated, adapted to wide application and utilization, and is readily applicable to virtually any shore situation.

Other objects and advantages of the invention will be apparent from the following description, the accompanying drawings and the appended claims.

BRIEF DESCRIPTION OF THE DRAWINGS

FIG. 1 is a view of a typical shore line showing the artificial shore machine located beneath the sea threadjacnet;

FIG. 2 is a perspective view of the shore machine of FIG. 1;

FIG. 3 is a view similar to FIG. 1 showing a modified version of the artificial shore machine;

FIG. 4 is a top view of the machine shown in FIG. 3, taken on line 4—4 thereof; and FIG. 5 is a bottom view of the machine shown in FIG. 4; and FIG. 6 is a view of a shore machine suspended in relatively deep water controlling waves adjacent a nearby ship.

DESCRIPTION OF THE PREFERRED EMBODIMENT

With reference to the drawings, and more particularly to FIG. 1, there is illustrated the artificial shore machine 10 of this invention. Machine 10 is designed to be located near the shore 12 of a body of water, and includes a substantially rectangular, open base framework 15 which is anchored to the floor 17 of the body of water near the shore. Base 15 is anchored beneath the surface of the body of water by means of any conventional anchorage, and for purposes of illustration the base 15 is anchored to floor 17 by means of legs 18 which are sunken into the floor.

A substantially planar platform 20 is attached to base 15 by means of a hinge 21. Hinge 21 is located on the side 23 of the base 15 closest to the incoming waves and farthest from the shore 12, and is attached to the side 24 of platform 20 which is also most distant from the shore 12.

In order to move platform 20 on hinge 21, and to vary and adjust the height and slope of the platform 20 relative to the base 15, a double acting hydraulic cylinder 25 is connected between the base 15 and platform 20 by means of hinges 27. The hydraulic cylinder 25, in turn, is connected to shore by means of hydraulic fluid hoses 28, and is remotely controlled by a remote control station 30 of conventional design, located conveniently on the shore. Control station 30 and hydraulic cylinder 25 are thus able to adjust and maintain the height and slope of platform 20 relative to base 15 to control the breaking of waves as they pass over the uppermost end of platform 20.

Machine 10, as described above, may be of any desired size according to the extent of the shore 12, the size of the waves to be controlled, tide variations, and so on. For generation of waves appropriate for surfboarding, for example, a platform as small as 15 feet in length (the dimension running perpendicularly to the shore or parallel to the direction of movement of the waves) and 30 feet in width, would be typical. The particular size and elevation of the platform, of course, will depend on the conditions which are to be produced. A surfboard rider might prefer a very gentle, spilling wave, or a powerful, plunging wave, and machine 10 would be dimensioned and adjusted accordingly. Also, several of the artificial shore machines 10 could be used in tandem to produce desired wave conditions or to maintain the waves in a breaking condition for a longer period of time.

To provide variable control of the waves, and hence increased surfboarding interest, another version of this invention is illustrated in FIG. 3. The artificial shore machine 35 of FIG. 3 is of particular interest in providing all types of surfing conditions for surfboard riding, and especially for providing controllable and selectable surfing conditions for such events as surfboard riding contests.

Artificial shore machine 35 includes a base 40, legs 41, platform 42, and hinge 43, the same as in machine 10. However, a turntable 45 is mounted intermediate base 40 and platform 42 on machine 35. Turntable 45 is mounted for rotation about base 40 on a turntable pivot 46 having an axis of rotation which is generally in a vertical direction, or perpendicular to base 40. A turntable drive means 48 is connected between turntable 45 and base 40 to rotate the turntable 45 and platform 42 about pivot 46 and relative to base 40. Turntable drive means 48 may be any appropriate drive means, such as a rack and pinion, an hydraulic actuating cylinder, and so on, and is also controllable remotely from remote control station 30, this time supported on board a floating barge near the shore.

Hinge 43 is attached to turntable 45 along the side 49 thereof most distant from shore 12, generally the same as platform 20 was attached directly to base 15 in machine 10. The hydraulic cylinder 50 in machine 35 is then attached between the platform 42 and turntable 45 for adjusting the height and slope of platform 42 the same as in machine 10.

Machine 35 thus enables platform 42 to be adjusted not only vertically with respect to the incoming waves, but also to be oriented horizontally, so that it may be turned either to face the incoming waves, or at an angle to cause the waves to pass thereacross from one side to the other. In the latter case, each wave will reach the elevated end of platform 42 on one side thereof before reaching the elevated end at the other side, and the wave will then break first over the one side first reached, and then continue to break as the wave passes across the elevated end of the platform to the other side. To an observer on shore, the wave would appear to break either from left to right, or right to left, rather than all at once.

Machine 35 is thus of particular interest in surfing contests where it would be possible to provide almost complete control of the manner in which each wave breaks. Further, the control station 30 could be provided with hydraulic pumps of sufficient capacity that the platform could be readjusted between waves so that the surfer wouldn't know what to expect. In fact, as an ultimate test of skill in a surfing contest, the platform could even be adjusted as the wave passed over it. Moving the platform up, down, and/or sideways would thus enable highly challenging waves to be created.

FIG. 6 illustrates the use of the shore machine of this invention in deep water, where floats 55 support a machine 60, similar to machine 10, at a predetermined depth beneath the water. The support lines 62 between floats 55 and machine 60 are adjusted for the proper depth, and the machine is oriented to place the hinge side 64 closest to the incoming waves and the platform upper edge 65 away from the approaching waves. Machine 60 may then be located wherever desired, such as near a ship 70, and may be controlled therefrom by hydraulic control lines 72, connected to machine 60. Of course, machine 60 could also be attached to and supported directly by the ship or any other floatation means, if desired.

As may be seen, therefore, this invention has numerous advantages. Where the machine is anchored to the sea floor 12 by a simple anchorage such as the legs 18, the machine is readily and easily movable from one location to the other. It may thus be moved adjacent a given shore until an ideal location is found. It may be moved in response to changing shore conditions. Large machines may be moved great distances to provide protection from dangerous storms.

This invention provides an artificial shore machine which allows for almost complete control of the breaking of the waves independently of the three variables normally present, namely, tide, wave height, and the constantly changing shore bottom conditions. Thus, where an ideal beach is spoiled due to a sea bed structure thereadjacent which causes large waves to break suddenly against the shore, this invention may be anchored just off the shore to cause the waves to break and attenuate earlier.

This machine may be used to attenuate waves having energy and forces many times greater than the strength of the particular shore machine being used. This is possible since this invention does not itself absorb and withstand the forces of the approaching waves, but instead simply induces the waves to destroy themselves by breaking prematurely (that is, earlier than they otherwise would) and then to dissipate their energy in massive and harmless turbulence. Thus, gentle wave conditions may be provided on the shores of resort areas; huge and destructive waves may be forced to destroy themselves long before reaching shore. This may be done by using one shore machine of this invention, or several in tandem, all of moderate size and cost in relation to the task being performed.

Where ideal conditions are to be provided for surfing, this invention causes the waves to break always at the same place, and is easily adjustable to provide almost any type of breaking conditions desired. All that is necessary is that the incoming waves have sufficient energy and height in the first place. Several of these machines may be used in tandem to maintain a wave in a breaking state almost all the way into shore, for even better surfboard riding conditions. Further, as indicated earlier, a machine constructed according to this invention and used for surfboard riding contests could be operated even as the wave and the surfer passed thereover, to provide exceptionally exciting challenges. This may be of particular interest due to the current popularity of surfboard riding, where a contest of this type would be expected to draw very large crowds.

Many other uses for this invention will of course occur to those skilled in the art. For example this invention could be used in conjunction with my invention as disclosed in U.S. Pat. No. 3,389,888, to improve the efficiency thereof by organizing the waves to cause them to plunge toward the receiving end of such a wave energy recovery device. In that case the velocity vectors of the wave would be directed substantially horizontally directly into the device, focusing and organizing the wave energy into it.

While the methods and form of apparatus herein described constitute preferred embodiments of this invention, it is to be understood that the invention is not limited to these precise methods and form of apparatus,

What is claimed is:

1. In a method of controlling waves by causing breaking thereof utilizing apparatus having a base, a platform mounted on said base, and means for moving said platform toward and away from said base, the steps comprising:
   a. disposing said apparatus in a body of water at a location therein where breaking of waves is desired,
   b. maintaining said base and an edge of said platform located nearest to approaching waves at a depth beneath the surface of the water greater than 1.3 times the height of approaching waves to place said base and said edge of said platform in a position relative to incoming waves such that siad base and said platform are subjected to relatively small wave forces,
   c. positioning an edge of said platform opposite said edge thereof located nearest to approaching waves at a depth beneath the surface of the water approximately equal to 1.3 times the height of waves passing thereover to cause breaking of the waves by inducing them to use up their energy acting against themselves in chaotic turbulence,
   d. monitoring breaking of said waves at said desired location, and
   e. maintaining said opposite edge of said platform beneath the surface of the water at a depth approximately equal to 1.3 times the height of waves passing thereover to cause continual breaking of the waves at said desired location.

2. The method of claim 1 further comprising:
   a. maintaining the position of said opposite edge of said platform at a depth beneath the surface of the water equal to approximately 1.3 times the height of approaching waves from a source positioned above the surface of the body of water.

3. The method of claim 1 further comprising:
   a. maintaining the position of said opposite edge of said platform at a depth beneath the surface of the water equal to approximately 1.3 times the height of approaching waves from a source positioned on land adjacent said body of water.

4. The method of claim 1 further comprising:
   a. maintaining the position of said opposite edge of said platform at a depth beneath the surface of the water equal to approximately 1.3 times the height of approaching waves from a source floating on the surface of said body of water.

5. In combination with a body of water having a floor and a shore line, the improvement comprising:
   a. a substantially rectangular, open base framework,
   b. a plurality of legs projecting downwardly from said framework and anchored in said floor beneath the surface of said body of water,
   c. a turntable,
   d. means rotatably attaching said turntable to said framework adjacent an edge thereof furthest from said shore line for rotation about a substantially vertical axis,
   e. a substantially planar platform,
   f. hinge means hingedly connecting said platform to said turntable along an edge thereof furthest from said shore line for pivoting movement about a substantially horizontal axis,
   g. first piston and cylinder means interconnecting said turntable and said framework for rotating said turntable about said rotatable attachment to said framework,
   h. second piston and cylinder means interconnecting said platform and said turntable for pivoting said platform with respect to said turntable about said hinge connection, and
   i. a source of fluid pressure positioned above said shore line and fluid supply lines extending from said source of fluid pressure to said first and said second pistons and cylinders to actuate said pistons and cylinders to rotate said turntable with respect to said framework and pivot said platform with respect to said turntable.

* * * * *